United States Patent
Minagata et al.

(10) Patent No.: US 10,777,365 B2
(45) Date of Patent: Sep. 15, 2020

(54) POWER STORAGE APPARATUS

(71) Applicant: KABUSHIKI KAISHA TOYOTA JIDOSHOKKI, Kariya-shi, Aichi-ken (JP)

(72) Inventors: Atsushi Minagata, Kariya (JP); Masato Ogasawara, Kariya (JP); Tomoaki Tachibana, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 16/487,909

(22) PCT Filed: Feb. 27, 2018

(86) PCT No.: PCT/JP2018/007304
§ 371 (c)(1),
(2) Date: Aug. 22, 2019

(87) PCT Pub. No.: WO2018/159625
PCT Pub. Date: Sep. 7, 2018

(65) Prior Publication Data
US 2020/0058452 A1    Feb. 20, 2020

(30) Foreign Application Priority Data

Feb. 28, 2017 (JP) .................... 2017-036918
Feb. 28, 2017 (JP) .................... 2017-036920

(51) Int. Cl.
*H01M 2/18* (2006.01)
*H01G 11/12* (2013.01)
(Continued)

(52) U.S. Cl.
CPC ............ *H01G 11/12* (2013.01); *H01G 11/52* (2013.01); *H01G 11/76* (2013.01);
(Continued)

(58) Field of Classification Search
CPC .............................. H01M 2/1673; H01M 2/18
See application file for complete search history.

(56) References Cited

U.S. PATENT DOCUMENTS

2011/0076544 A1   3/2011   Maeda et al.
2012/0321932 A1   12/2012  Ise et al.
(Continued)

FOREIGN PATENT DOCUMENTS

JP    2011-76838 A    4/2011
JP    2014-022244 A   2/2014
(Continued)

OTHER PUBLICATIONS

International Search Report for PCT/JP2018/007304 dated Apr. 24, 2018 (PCT/ISA/210).

*Primary Examiner* — Olatunji A Godo
(74) *Attorney, Agent, or Firm* — Sughrue Mion, PLLC

(57) ABSTRACT

A power storage apparatus includes bag-shaped separators. Each of the bag-shaped separators includes a first welded portion and a first non-welded portion. The first welded portion exists along a first edge of the bag-shaped separator and is formed by welding the surplus sections of the separator members together. In the first non-welded portion, the separator members are not welded together. The bag-shaped separator includes a second welded portion and a second non-welded portion. The second welded portion exists along a second edge and is formed by welding the surplus sections of the separator members together. The second non-welded portion is located closer to the second edge than the second welded portion. In the second non-welded portion, the separator members are not welded together. In the power storage apparatus, the width of the first non-welded portion>the width of the second non-welded portion.

4 Claims, 4 Drawing Sheets

(51) Int. Cl.
*H01G 11/52* (2013.01)
*H01G 11/76* (2013.01)
*H01M 2/16* (2006.01)
*H01M 4/02* (2006.01)

(52) U.S. Cl.
CPC .......... *H01M 2/1673* (2013.01); *H01M 2/18* (2013.01); *H01M 2004/027* (2013.01); *H01M 2004/028* (2013.01)

(56) References Cited

U.S. PATENT DOCUMENTS

2015/0140401 A1   5/2015  Minagata
2016/0322626 A1*  11/2016 Okuda .................. H01G 11/52

FOREIGN PATENT DOCUMENTS

| | | |
|---|---|---|
| JP | 2014-038801 A | 2/2014 |
| JP | 2014-110160 A | 6/2014 |
| JP | 2016-051533 A | 4/2016 |
| WO | 2011/099224 A1 | 8/2011 |
| WO | 2013/180198 A1 | 12/2013 |
| WO | 2016/136550 A1 | 9/2016 |

* cited by examiner

POWER STORAGE APPARATUS

CROSS REFERENCE TO RELATED APPLICATIONS

This application is a National Stage of International Application No. PCT/JP2018/007304 filed Feb. 27, 2018, claiming priorities based on Japanese Patent Application Nos. 2017-036918 filed Feb. 28, 2017 and 2017-036920 filed Feb. 28, 2017.

TECHNICAL FIELD

The present invention relates to a power storage apparatus including an electrode assembly having a stacked structure in which first electrodes are stacked alternately with second electrodes each accommodated in a bag-shaped separator.

BACKGROUND ART

Vehicles such as electric vehicles (EVs) and plug-in hybrid vehicles (PHVs) have a rechargeable battery serving as a power storage apparatus for storing electric power that should be supplied to a traveling motor. As one such rechargeable battery, for example, known is a rechargeable battery having a stacked structure in which positive electrodes, negative electrodes, and separators insulating the electrodes, are stacked alternately to form an electrode assembly. However, accomplishing the stacked structure requires manufacturing steps of sequentially stacking the positive electrodes, the negative electrodes, and the separators, that is, a great number of stacking steps. This prolongs the production cycle time and thus decreases productivity. To solve this problem, a technique has been devised to decrease the number of the aforementioned stacking steps and thus improve productivity for rechargeable batteries by, for example, accommodating positive electrodes in bag-shaped separators in advance (see Patent Document 1).

As described in Patent Document 1, a bag-shaped separator is configured by welding protruding sections of opposed first and second sheet-like separators (separator members) to each other. The bag-shaped separator accommodates a positive electrode and a tab of the positive electrode projects from the bag-shaped separator. In stacking steps of bag-shaped separators and negative electrodes, edges of the bag-shaped separators and edges of the negative electrodes are positioned by being brought into contact with a positioning member. These edges should be located on the bottom of an electrode assembly. The stacking steps of bag-shaped separators and negative electrodes include a step of conveying the bag-shaped separators to a position at which the steps of stacking the bag-shaped separators with the negative electrodes will be performed. The bag-shaped separators are conveyed after the edges of the bag-shaped separators are brought into contact with the positioning member and the bag-shaped separators are arranged at predetermined positions.

PRIOR ART DOCUMENT

Patent Document

Patent Document 1: Japanese Laid-Open Patent Publication No. 2016-51533

SUMMARY OF THE INVENTION

Problems that the Invention is to Solve

However, the edges of the bag-shaped separators may become deformed when being brought into contact with the positioning member for positioning before conveying the bag-shaped separators or at the time of stacking the negative electrodes and the bag-shaped separators together. Such deformation may hamper the conveying of the bag-shaped separators or the positioning of the bag-shaped separators with respect to the negative electrodes. To avoid this, each bag-shaped separator may have a welded portion with a great surface area along the edge that should be brought into contact with the positioning member. This increases rigidity in the section of the bag-shaped separator that contacts the positioning member. However, to provide the welded portion with a great surface area, a great amount of energy is needed for welding.

Accordingly, it is an objective of the present invention to provide a power storage apparatus that allows for accurate positioning at the time of stacking while decreasing the energy needed to form a welded portion.

Means for Solving the Problems

To achieve the foregoing objective, a power storage apparatus is provided that includes an electrode assembly having a stacked structure in which first electrodes and second electrodes are stacked alternately. Each of the first electrodes includes a tab shaped to project from an edge of the first electrode. Each of the second electrodes is accommodated in a bag-shaped separator and has a tab shaped to project from an edge of the second electrode. Each of the bag-shaped separators includes a first separator member, a second separator member, a surplus section, a first welded portion, a first non-welded portion, a second welded portion, and a second non-welded portion. The first separator member and the second separator member are opposed to each other with the second electrode located in between. The surplus section exists in a section of each of the separator members surrounding the second electrode. The first welded portion exists along a first edge that is the edge of the bag-shaped separator from which the tab projects. The first welded portion is formed by welding the surplus sections of the separator members together. The first non-welded portion is located closer to the first edge than the first welded portion and in which the separator members are not welded together. The second welded portion exists along a second edge that is an opposite side to the first edge of the bag-shaped separator. The second welding portion is formed by welding the surplus sections of the separator members together. The second non-welded portion is located closer to the second edge than the second welded portion and in which the separator members are not welded together. The dimension of each of the first and second non-welded portions in a surface direction of the bag-shaped separator and a direction orthogonal to the edge is defined as a width, the following expression is satisfied:

the width of the first non-welded portion>the width of the second non-welded portion.

In this configuration, each of the welded portions, which is formed by welding the surplus sections of the separator members together, has increased rigidity, compared to a single separator member. As indicated by the expression: Width of First Non-welded portion>Width of Second Non-welded portion, regarding the welded portions, the surface area of the second welded portion is greater than the surface area of the first welded portion. The rigidity of the second welded portion is thus greater than the rigidity of the first welded portion. The second welded portion thus limits deformation in the vicinity of the second edge of the bag-shaped separator, when the second edge of the bag-shaped separator is brought into contact with the positioning member to position the second edge at the time of conveying the bag-shaped separator or in the step of stacking the first electrodes with the second electrodes, which are accommodated in the corresponding bag-shaped separators. This allows for accurate conveyance of the bag-shaped separators following the aforementioned positioning and accurate positioning of the first electrodes and the bag-shaped separators. A similar advantage is obtained not only in a case in which the first electrodes and the second edges of the bag-shaped separators are simultaneously brought into contact with the positioning member for positioning but also in a case in which only the second edges of the electrode accommodating separators are brought into contact with the positioning member for positioning. Also, the surface area of the second welded portion is greater than the surface area of the first welded portion. On the other hand, the first non-welded portion on the side corresponding to the first edge, which is not involved in the aforementioned positioning, has a greater surface area than the second non-welded portion. This decreases the energy necessary for manufacturing the bag-shaped separators.

In the above-described power storage apparatus, the second electrodes are preferably positive electrodes.

In this configuration, as viewed in the stacking direction of the negative electrodes and the bag-shaped separators, each positive electrode is smaller in size than each negative electrode. Therefore, compared to a case in which the bag-shaped separators accommodate the negative electrodes, each welded portion has a small surface area and thus decreases the energy necessary for manufacturing the bag-shaped separators.

In the above-described power storage apparatus, the first welded portion exists over the entire first edge in the extending direction of the first edge, and the second welded portion exists over the entire second edge in the extending direction of the second edge.

This configuration limits the entering of foreign matter from the first edge and the second edge into each bag-shaped separator.

To achieve the foregoing objective, a power storage apparatus that includes an electrode assembly in a case is provided. The electrode assembly has a stacked structure in which first electrodes and second electrodes are stacked alternately together. Each second electrode is accommodated in a bag-shaped separator. The bag-shaped separator includes a first separator member, a second separator member, a surplus section, a welded portion, and a non-welded portion. The first separator member and the second separator member are opposed to each other with an associated one of the second electrodes located in between. The surplus section exists in a section of each of the separator members surrounding the second electrode. The welded portion exists over an entire edge of the bag-shaped separator in the extending direction of the edge. The welded portion is formed by welding the surplus sections of the separator members together. The non-welded portion is located closer to the edge than the welded portion in each of the surplus sections. The separator members is not welded together in the non-welded portion.

With this configuration, each welded portion, which is formed by welding the surplus sections of the separator members together, has increased rigidity, compared to a single separator member. The welded portion thus limits deformation in the vicinity of the edge of the bag-shaped separator contacting the positioning member, when the edge of the bag-shaped separator is brought into contact with the positioning member to position the edges of the corresponding first and second electrodes at the time of conveying the bag-shaped separator or in the step of stacking the first electrodes with the second electrodes, which are accommodated in the corresponding bag-shaped separators. This allows for accurate conveyance of the bag-shaped separators following the aforementioned positioning and accurate positioning of the first electrodes and the bag-shaped separators. Also, employing the non-welded portion decreases the welding surface area by the corresponding amount, compared to, for example, a case in which the surplus section of each separator member lacks the non-welded portion and is thus configured exclusively by the welded portion. This decreases the energy necessary for welding in the manufacturing of the bag-shaped separators.

In the above-described power storage apparatus, the non-welded portion may exist over the entire edge in the extending direction of the edge.

With this configuration, the section of each surplus section other than the section in which the welded portion is disposed is configured entirely by the non-welded portion. This decreases the energy necessary for welding, compared to, for example, a case in which an additional welded portion is arranged in a section other than the section in which the welded portion is located.

In the above-described power storage apparatus, the case may have a case main body that accommodates the electrode assembly and a lid that closes an opening of the case main body. Each of the first and second electrodes may include a tab shaped to project from an edge. A conductive member and an electrode terminal may be connected to the tab. The electrode terminal may be fixed to the lid. The tab of each second electrode may be shaped to project from an edge of the bag-shaped separator. The non-welded portion may exist along the edge of the bag-shaped separator from which the tab projects.

With this configuration, a step of assembling the power storage apparatus may employ a method in which the electrode terminals are connected to the corresponding tabs of the first and second electrodes through the conductive member, the electrode terminals are then fixed to the lid to form the lid terminal assembly, and the electrode assembly is accommodated in the case main body before the lid is joined to the case main body. According to this method, the lid terminal assembly and the electrode assembly are integrated with each other by means of the tabs. To accommodate the electrode assembly, which is integrated with the lid terminal assembly, in the case main body, the electrode assembly is pressed into the case main body through the lid terminal assembly until the bottom side of the electrode assembly reaches a position in the vicinity of the inner bottom surface of the case main body. At this stage, the lid terminal assembly contacts the non-welded portions of the bag-shaped separators, thus flexing the non-welded portions. Such flexing absorbs the force that presses the electrode assembly into the case main body. This makes it unlikely that the electrode assembly will be intensely pressed into the case main body, thus restricting hitting of the electrode assembly against the inner bottom surface of the case main body.

In the above-described power storage apparatus, the dimension of the welded portion in a surface direction of the bag-shaped separator and a direction orthogonal to the edge of the bag-shaped separator is defined as a weld width. A welded portion existing along a first edge that is the edge of the bag-shaped separator from which the tab projects is defined as a first welded portion. A welded portion existing along a second edge that is the opposite side to the first edge is defined as a second welded portion. The following expression is satisfied:

the weld width of the first welded portion≤the weld width of the second welded portion.

With this configuration, the rigidity of the second welded portion is greater than the rigidity of the first welded portion in each bag-shaped separator. As a result, when the electrode assembly is accommodated in the case main body, deformation of each second welded portion is limited even if the second edge contacts the inner bottom surface of the case main body. Also, before conveying the electrode accommodating separators or when stacking the first electrodes with the second electrodes accommodated in the corresponding bag-shaped separators, the second edges are brought into contact with the positioning member and thus positioned. At the time of such positioning, each second welded portion limits deformation in the vicinity of the second edge. This allows for accurate conveyance of the electrode accommodating separators and accurate positioning of the first electrodes with the bag-shaped separators.

In the above-described power storage apparatus, the non-welded portion exists along all edges of the bag-shaped separator.

This configuration decreases the energy necessary for welding.

The above-described power storage apparatus is a rechargeable battery.

Effects of the Invention

The present invention allows for accurate positioning at the time of stacking while decreasing the energy necessary for forming a welded portion.

MODES FOR CARRYING OUT THE INVENTION

A power storage apparatus according to an embodiment will now be described with reference to FIGS. 1 to 6. The apparatus is applied to a rechargeable battery.

Figure 1:
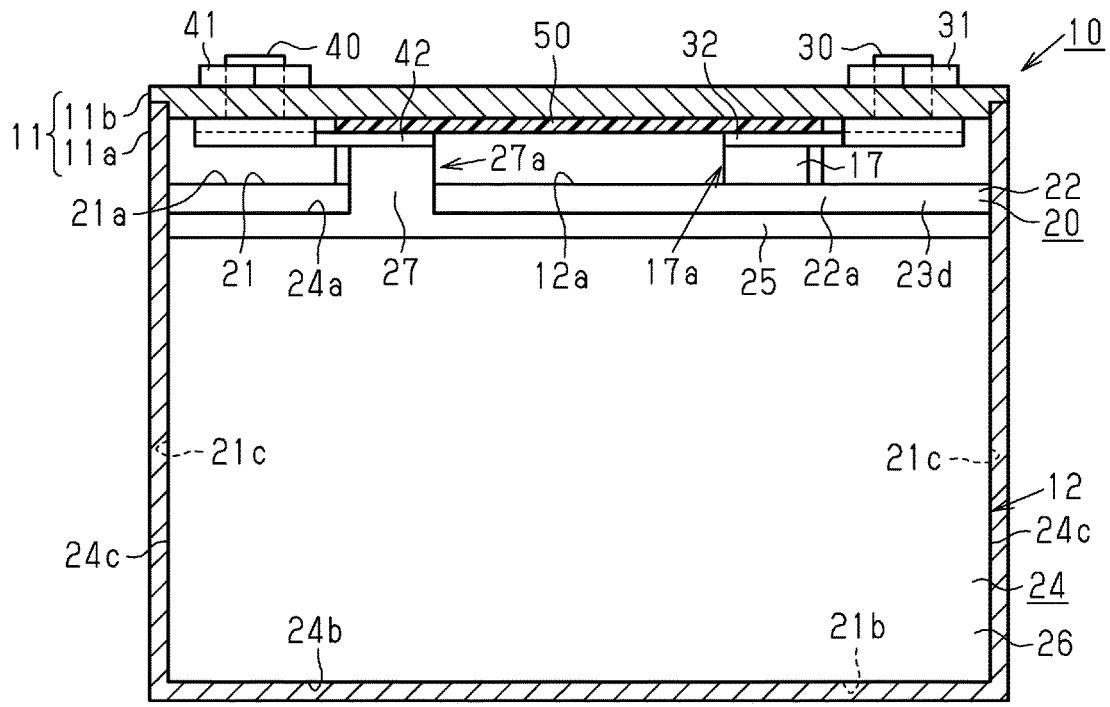
FIG. 1 is a cross-sectional view showing a rechargeable battery according to an embodiment.

As shown in FIG. 1, a rechargeable battery 10 serving as a power storage apparatus includes a parallelepiped case 11. An electrode assembly 12 is accommodated in the case 11. The case 11 has a case main body 11a and a lid 11b. The case main body 11a is made of metal (for example, aluminum or aluminum alloy) and shaped like a rectangular tube with a bottom. The lid 11b closes the opening of the case main body 11a. Although not illustrated, electrolyte (liquid electrolytic) is retained in the case 11. The rechargeable battery 10 of the present embodiment is a lithium-ion rechargeable battery.

Figure 2:
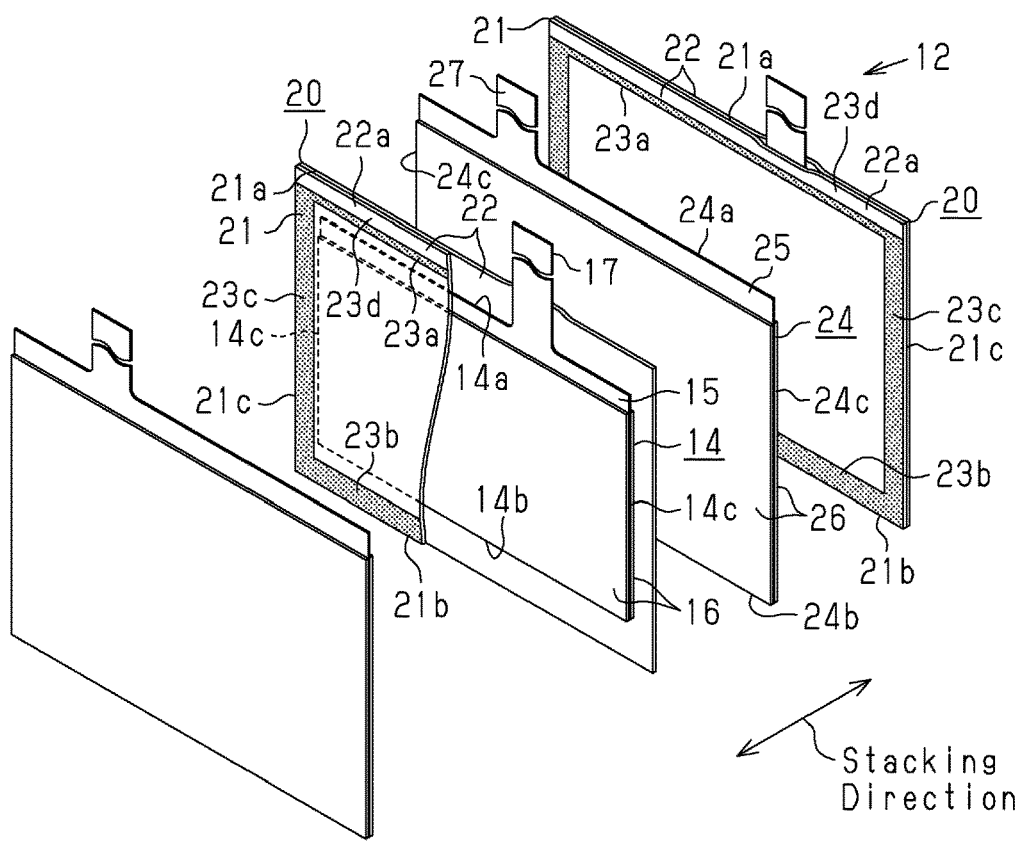
FIG. 2 is an exploded perspective view showing components of an electrode assembly.

Referring to FIG. 2, the electrode assembly 12 has multiple negative electrodes 24 as first electrodes and multiple electrode accommodating separators 20. Each of the electrode accommodating separators 20 accommodates a positive electrode 14, which is a second electrode having different polarity from that of each negative electrode 24. The electrode assembly 12 has a stacked structure in which the electrode accommodating separators 20 and the negative electrodes 24 are alternately stacked together. The direction in which the electrode accommodating separators 20 and the negative electrodes 24 are stacked together is defined as the stacking direction. The positive electrodes 14 and the negative electrodes 24 are stacked alternately together in a state in which bag-shaped separators 21 of the electrode accommodating separators 20 are each located between the corresponding adjacent pair of the positive and negative electrodes 14, 24. In the present embodiment, as viewed in the stacking direction, the positive electrodes 14, the bag-shaped separators 21, and the negative electrodes 24 all have a rectangular shape.

Each of the positive electrodes 14 has a rectangular sheet-like positive electrode metal film (aluminum film, for example) 15 and a positive electrode active material layer 16. The positive electrode active material layer 16 includes the positive electrode active material in the opposite sides of the positive electrode metal film 15. Each positive electrode 14 has a first edge 14a as one of the edges along the opposite long sides. The positive electrode 14 has a positive electrode tab 17 having a shape projecting from the first edge 14a, which is the aforementioned one of the opposite edges. The positive electrode tab 17 is a section of the positive electrode metal film 15 on which the positive electrode active material layer 16 is not applied and is thus configured directly by the positive electrode metal film 15. The positive electrode 14 has a second edge 14b at the edge that is the opposite side to the first edge 14a. The positive electrode 14 also has third edges 14c as the edges along the opposite short sides connecting the first edge 14a to the second edge 14b.

Each of the negative electrodes 24 has a rectangular sheet-like negative electrode metal film (copper film, for example) 25 and a negative electrode active material layer 26. The negative electrode active material layer 26 includes the negative electrode active material in the opposite sides of the negative electrode metal film 25. Each negative electrode 24 has a first edge 24a as one of the edges along the opposite long sides. The negative electrode 24 has a negative electrode tab 27 having a shape projecting from the first edge 24a, which is the aforementioned one of the opposite edges. The negative electrode tab 27 is a section of the negative electrode metal film 25 on which the negative electrode active material layer 26 is not applied and is thus configured directly by the negative electrode metal film 25. The negative electrode 24 has a second edge 24b at the edge that is the opposite side to the first edge 24a. The negative electrode 24 also has third edges 24c as the edges along the opposite short sides connecting the first edge 24a to the second edge 24b.

As the negative electrodes 24 and the positive electrodes 14 are viewed in the stacking direction, the length of the first edge 24a of each negative electrode 24 is greater than the length of the first edge 14a of each positive electrode 14. The length of the second edge 24b of the negative electrode 24 is also greater than the length of the second edge 14b of the positive electrode 14. Further, the length of each third edge 24c of the negative electrode 24 is greater than the length of each third edge 14c of the positive electrode 14. As a result, as viewed in the stacking direction, the negative electrode 24 is slighter larger than the positive electrode 14.

Each of the bag-shaped separators 21 is formed by welding first and second rectangular sheet-like separator members to each other. The first and second separator members are opposed to each other with the associated positive electrode 14 located in between. Since the first and second separator members are shaped identically, both will be referred to as separator members 22 in the description below. Each of the separator members 22 is made of insulating plastic (for example, polyethylene).

Figure 3:
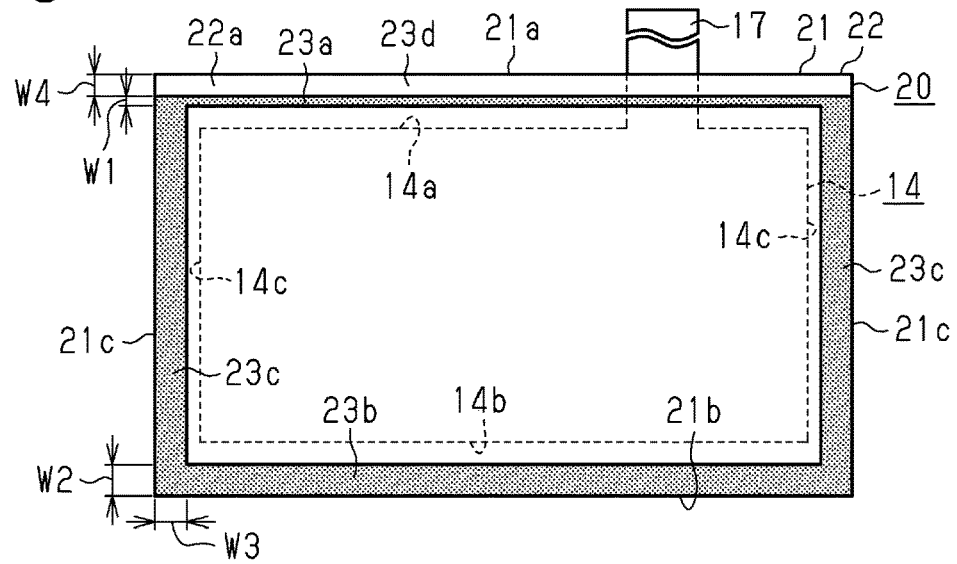
FIG. 3 is a plan view showing a bag-shaped separator.

As illustrated in FIG. 3, each bag-shaped separator 21 has a first edge 21a parallel to the first edge 14a of the positive electrode 14. The bag-shaped separator 21 has a second edge 21b at the edge that is the opposite side to the first edge 21a. The second edge 21b is parallel to the second edge 14b of the positive electrode 14. The bag-shaped separator 21 also has third edges 21c at the opposite edges connecting the first edge 21a to the second edge 21b. The third edges 21c are parallel to the third edges 14c of the positive electrode 14.

Each of the separator members 22 of the bag-shaped separator 21 has a surplus section 22a in protruding sections of the separator member 22 with respect to the first edge 14a, the second edge 14b, and the opposite third edges 14c of the corresponding positive electrode 14. The surplus section 22a of each separator member 22 is thus shaped like a rectangular loop that surrounds the positive electrode 14. The dimension of the surplus section 22a in directions along the surface direction of the bag-shaped separator 21 and are orthogonal to the edges 21a to 21c (hereinafter, referred to as the orthogonal directions of the bag-shaped separator 21) is defined as the width of the surplus section 22a. The width of the surplus section 22a is equal in the section of the surplus section 22a along the first edge 21a and the section of the surplus section 22a along the second edge 21b.

Each bag-shaped separator 21 includes welded portions, which are formed by welding the surplus sections 22a of both separator members 22 together. The bag-shaped separator 21 includes a first welded portion 23a in the sections of the surplus sections 22a along the first edge 21a and a second welded portion 23b in the sections of the surplus sections 22a along the second edge 21b. The bag-shaped separator 21 includes third welded portions 23c in the sections of the surplus sections 22a along the third edges 21c.

The first welded portion 23a exists from one end in the extending direction of the first edge 21a to the positive electrode tab 17 and from the positive electrode tab 17 to the other end in the extending direction of the first edge 21a. The first welded portion 23a thus exists over the entire first edge 21a, except for the section corresponding to the positive electrode tab 17, in the extending direction of the first edge 21a.

The second welded portion 23b exists over the entire second edge 21b in the extending direction of the second edge 21b. The third welded portions 23c extend in a state connecting the corresponding end sections of the first welded portion 23a and the second welded portion 23b. Therefore, as viewed in the stacking direction, the first to third welded portions 23a to 23c extend over the entire circumference of the bag-shaped separator 21.

As viewed in the stacking direction, the first welded portion 23a exists between the first edge 14a of the positive electrode 14 and the first edge 21a of the bag-shaped separator 21 in the orthogonal direction of the bag-shaped separator 21. The second welded portion 23b exists between the second edge 14b of the positive electrode 14 and the second edge 21b of the bag-shaped separator 21. The second welded portion 23b exists from a section spaced from the second edge 14b of the positive electrode 14 to the second edge 21b of the bag-shaped separator 21. The second welded portion 23b also exists on the second edge 21b of the bag-shaped separator 21. Further, as viewed in the stacking direction, each third welded portion 23c exists between the corresponding third edge 14c of the positive electrode 14 and the corresponding third edge 21c of the bag-shaped separator 21 in the orthogonal direction of the bag-shaped separator 21. The third welded portion 23c extends from a section spaced from the third edge 14c of the positive electrode 14 to the third edge 21c of the bag-shaped separator 21. The third welded portions 23c also exist on the corresponding third edges 21c of the bag-shaped separator 21.

The widths of the first to third welded portions 23a to 23c in the orthogonal direction of the bag-shaped separator 21 are defined as the weld widths. The weld width W1 of the first welded portion 23a is smaller than or equal to the weld width W2 of the second welded portion 23b. The following expression is thus satisfied.

The weld width W1 of the first welded portion 23a≤the weld width W2 of the second welded portion 23b In the present embodiment, the weld width W1 of the first welded portion 23a is smaller than the weld width W2 of the second welded portion 23b.

The weld width W2 of the second welded portion 23b is equal to the weld width W3 of each third welded portion 23c. The following expression is thus satisfied.

The weld width W2 of the second welded portion 23b=the weld width W3 of the third welded portion 23c As a result, the weld width W1 of the first welded portion 23a is smaller than both the welding with W2 of the second welded portion 23b and the weld width W3 of the third welded portion 23c.

Each bag-shaped separator 21 includes a first non-welded portion 23d in the sections of the surplus sections 22a along the first edge 21a. The first non-welded portion 23d is located closer to the first edge 21a than the first welded portion 23a in the orthogonal direction of the bag-shaped separator 21. The first non-welded portion 23d exists over the entire first edge 21a in the extending direction of the first edge 21a. The first non-welded portion 23d refers to a section in which the surplus sections 22a of both separator members 22 are not welded together.

The dimension of the first non-welded portion 23d in the orthogonal direction of the bag-shaped separator 21 is defined as a width W4. The width W4 of the first non-welded portion 23d is greater than the weld width W1 of the first welded portion 23a. The first non-welded portion 23d corresponds to a large range of each surplus section 22a. The surface area of the first welded portion 23a is thus smaller than the surface area of the first non-welded portion 23d. In contract, the section of each surplus section 22a along the second edge 21b of the bag-shaped separator 21 includes only the second welded portion 23b and lacks a second non-welded portion. Therefore, in the present embodiment, the width W5 of the second non-welded portion W5 is zero.

As a result, the width W4 of the first non-welded portion 23d is greater than the width W5 of the second non-welded portion. The following expression is thus satisfied.

Figure 4:
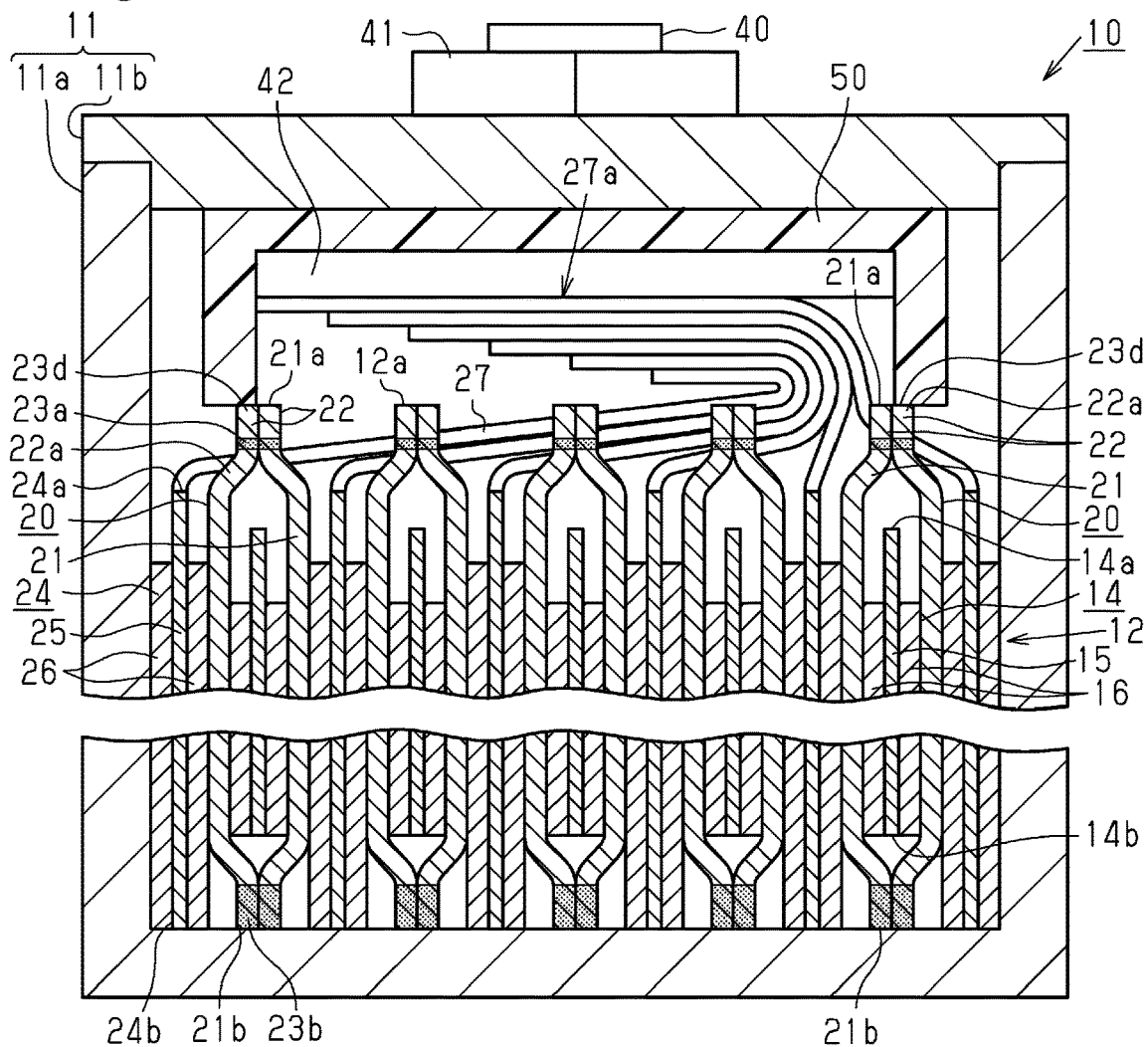
FIG. 4 is a cross-sectional view showing the interior of the rechargeable battery.
Figure 5:
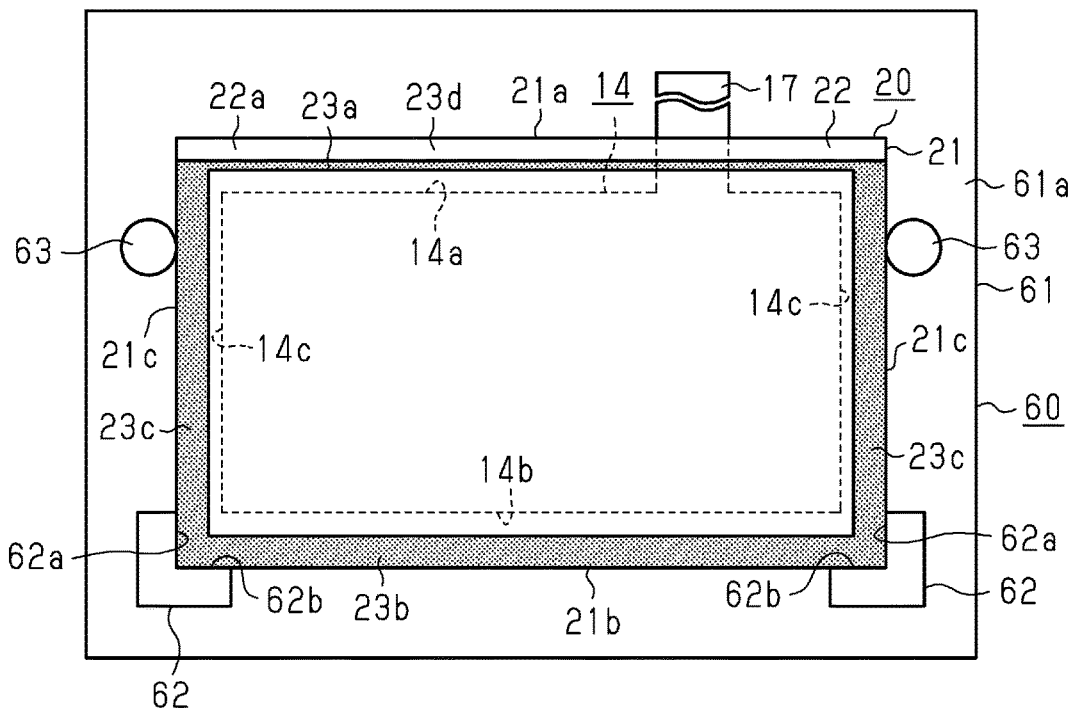
FIG. 5 is a diagram showing a state in which positioning is performed using a positioning member.

The width W4 of the first non-welded portion 23d>the width W5 of the second non-welded portion As shown in FIG. 1 or 4, the electrode assembly 12 includes a tab-side end face 12a on the end face opposed to the lid 11b. The electrode assembly 12 also includes a positive electrode tab group 17a and a negative electrode tab group 27a on the tab-side end face 12a. The tab-side end face 12a is configured by stacking the edges of the first edges 21a of the bag-shaped separators 21 together. The positive electrode tab group 17a is configured by stacking the positive electrode tabs 17 together. The negative electrode tab group 27a is configured by stacking the negative electrode tabs 27 together. The positive electrode tab group 17a is formed by gathering the positive electrode tabs 17 on one end in the stacking direction of the electrode assembly 12 and then folding the positive electrode tabs 17 toward the other end in the stacking direction. The negative electrode tab group 27a is formed by gathering the negative electrode tabs 27 on one end in the stacking direction of the electrode assembly 12 and then folding the negative electrode tabs 27 toward the other end in the stacking direction.

As shown in FIG. 1, the rechargeable battery 10 has a positive electrode terminal 30 and a negative electrode terminal 40. The positive and negative electrode terminals 30, 40 are each fixed to the lid 11b to project to the exterior of the case 11. The negative electrode terminal 40 is electrically connected to the negative electrode tab group 27a of the electrode assembly 12 through a negative electrode conductive member 42. The negative electrode conductive member 42 is made of metal (for example, copper), shaped like a rectangular plate, and joined to an end section of the negative electrode terminal 40 projecting to the interior of the case 11. The positive electrode terminal 30 is electrically connected to the positive electrode tab group 17a of the electrode assembly 12 through a positive electrode conductive member 32. The positive electrode conductive member 32 is made of metal (for example, aluminum), shaped like a rectangular plate, and electrically connected to an end section of the positive electrode terminal 30 projecting to the interior of the case 11.

With reference to FIGS. 1 and 4, the rechargeable battery 10 includes an inversed U-shaped insulating member 50 in the case 11 to insulate the negative electrode conductive member 42 and the positive electrode conductive member 32 from the lid 11b.

The method of manufacturing the rechargeable battery 10 and operation of the rechargeable battery 10 will now be described.

First, the electrode assembly 12 is manufactured.

To manufacture the electrode assembly 12, the electrode accommodating separators 20, each of which has the bag-shaped separator 21 accommodating the positive electrode 14, and the negative electrodes 24 are stacked together. At this stage, referring to FIG. 5, the electrode accommodating separators 20 and the negative electrodes 24 are positioned by bringing the second edges 21b, 24b into contact with a positioning member 60.

The positioning member 60 includes a rectangular base 61 and two L-shaped first guides 62, as viewed from above. The first guides 62 extend upright from an upper surface 61a of the base 61 and are located at opposite positions in the longitudinal direction of the base 61. Each of the first guides 62 includes a first guide surface 62a. In positioning, the first guide surfaces 62a extend along the corresponding third edges 21c of the bag-shaped separators 21 and the corresponding third edges 24c of the negative electrodes 24. The first guide surfaces 62a are opposed to each other in the longitudinal direction of the base 61.

Each of the first guides 62 also has a second guide surface 62b. In positioning, the second guide surfaces 62b extend along the second edges 21b of the bag-shaped separators 21 and the second edges 24b of the negative electrodes 24. The second guide surfaces 62b are flush with each other.

The positioning member 60 also includes second guides 63 on the base 61. In positioning, the second guides 63 extend along the corresponding third edges 21c of the bag-shaped separators 21 and the corresponding third edges 24c of the negative electrodes 24. Each of the second guides 63 is aligned with the corresponding one of the first guide surfaces 62a in the transverse direction of the base 61.

The electrode accommodating separators 20 and the negative electrodes 24 are stacked together while being positioned using the positioning member 60. At this stage, the third edges 21c of the bag-shaped separators 21 and the third edges 24c of the negative electrodes 24 are held in slidable contact with the corresponding second guides 63 and first guide surfaces 62a and thus guided to the second guide surfaces 62b. In this manner, the second edges 21b of the bag-shaped separators 20 and the second edges 24b of the negative electrodes 24 come into contact with the second guide surfaces 62b. This restricts movement of the electrode accommodating separators 20 and movement of the negative electrodes 24. The second edges 21b of the electrode accommodating separators 20 and the second edges 24b of the negative electrodes 24 are thus positioned to be flush with one another. After stacking a predetermined number of electrode accommodating separators 20 with a predetermined number of negative electrodes 24, the manufacture of the electrode assembly 12 is complete.

Subsequently, the positive electrode tab group 17a and the negative electrode tab group 27a are formed in the electrode assembly 12 before the positive electrode conductive member 32 is welded to the positive electrode tab group 17a and then the positive electrode terminal 30 is welded to the positive electrode conductive member 32. Also, the negative electrode conductive member 42 is welded to the negative electrode tab group 27a and then the negative electrode terminal 40 is welded to the negative electrode conductive member 42. Next, the negative electrode conductive member 42 and the positive electrode conductive member 32 are covered by the insulating member 50. In this state, an external screw of the positive electrode terminal 30 and an external screw of the negative electrode terminal 40 are passed through the lid 11b. A nut 31 and a nut 41 are then threaded onto the positive electrode external screw and the negative electrode external screw, respectively. In this manner, the positive electrode terminal 30 and the negative electrode terminal 40 are fastened to the lid 11b.

Figure 6:
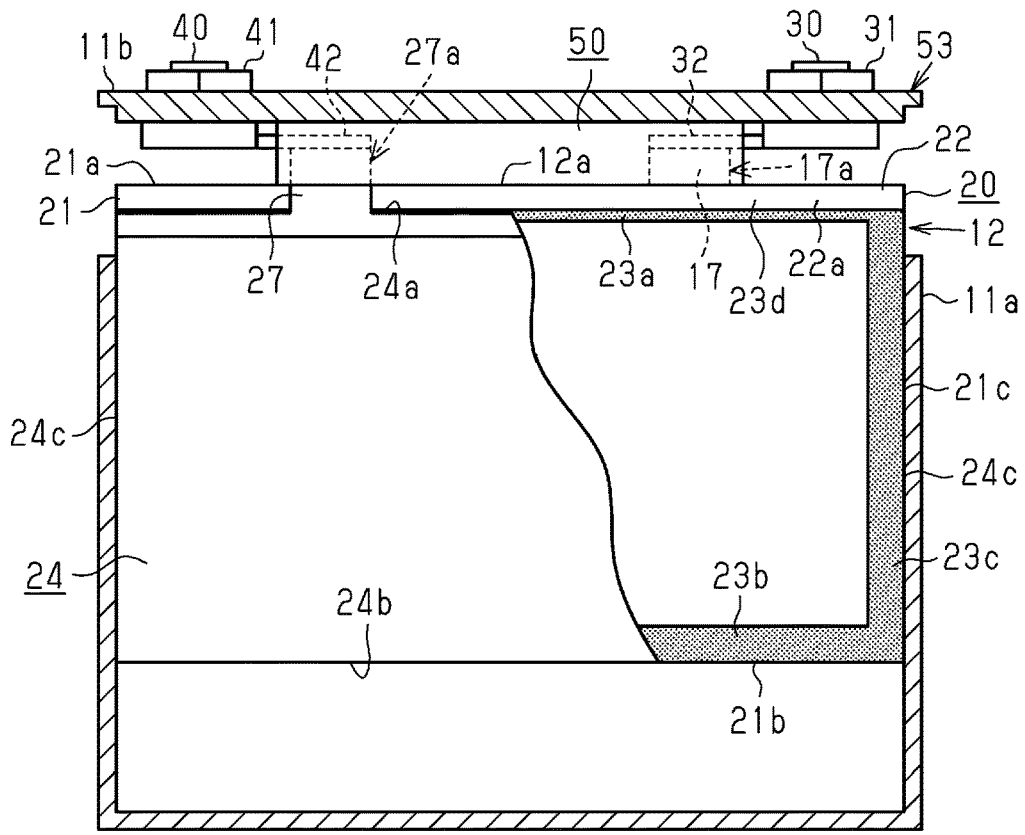
FIG. 6 is a diagram showing a state in which the electrode assembly is pressed into a case main body through a lid terminal assembly.

As a result, as illustrated in FIG. 6, the lid 11b, the positive electrode conductive member 32, the negative electrode conductive member 42, the positive electrode terminal 30, the negative electrode terminal 40, and the insulating member 50 are integrated with one another, thus configuring the lid terminal assembly 53. In the lid terminal assembly 53, the insulating member 50 insulates the conductive members 32, 42 from the lid 11b. The lid terminal assembly 53 and the electrode assembly 12 extend continuously to each other through the positive electrode tab group 17a and the negative electrode tab group 27a.

In the electrode assembly 12, the first edges 21a of the bag-shaped separators 21 in the electrode accommodating separators 20 are located closer to the lid 11b than the first edges 24a of the negative electrodes 24. The first non-welded portions 23d are thus located closer to the lid 11b than the first welded portions 23a.

Next, the electrode assembly 12 is inserted into the case main body 11a through the opening of the case main body 11a. At this stage, the lid 11b is pressed in toward the electrode assembly 12 such that the electrode assembly 12 is pressed into the case main body 11a through the first non-welded portions 23d existing on the first edges 21a of the bag-shaped separators 21. The force that presses the lid terminal assembly 53 is transmitted to the electrode assembly 12 through the positive electrode tab group 17a and the negative electrode tab group 27a. This causes the second edges 21b of the electrode accommodating separators 20 and the second edges 24b of the negative electrodes 24 on the bottom side of the electrode assembly 12 to contact the inner bottom surface of the case main body 11a. In this manner, the electrode assembly 12 is fully accommodated in the case main body 11a. Then, the lid 11b and the case main body 11a are joined to each other and the opening of the case main body 11a is closed. The rechargeable battery 10 is thus fully assembled.

The present embodiment has the following advantages.

(1) The bag-shaped separator 21 of each electrode accommodating separator 20 satisfies the expression: the width W4 of the first non-welded portion 23d>the width W5 of the second non-welded portion. Therefore, the surface area of the non-welded portion becomes small on the side corresponding to the second edge 21b of the bag-shaped separator 21 that contacts the positioning member 60 at the time of the above-described positioning. On the other hand, a great surface area is secured for the second welded portion 23b to increase rigidity. Therefore, even when the second edge 21b contacts the first guides 62, the second welded portion 23b limits deformation in the vicinity of the second edge 21b. This allows for accurate positioning of the negative electrodes 24 and the electrode accommodating separators 20. In contrast, the side corresponding to the first edge 21a is not involved in the positioning and, on this side, the surface area of the first non-welded portion 23d is greater than the surface area of the second non-welded portion. This decreases the energy necessary for manufacturing the bag-shaped separator 21.

(2) Each electrode accommodating separator 20 has the positive electrode 14 accommodated in the bag-shaped separator 21. As viewed in the stacking direction, each positive electrode 14 is smaller in size than each negative electrode 24. Therefore, compared to a case in which the bag-shaped separators 21 accommodate the negative electrodes 24, the surface area of the welded portion is small, thus decreasing the energy necessary for welding.

(3) The first to third welded portions 23a to 23c are arranged like a rectangular loop in a manner surrounding the positive electrode 14. This limits the entering of foreign matter into each bag-shaped separator 21.

(4) The first non-welded portion 23d of each bag-shaped separator 21 exists along the first edge 21a of the bag-shaped separator 21 from which the associated positive electrode tab 17 projects. The first edge 21a does not contact the positioning member 60 at the time of positioning for stacking. The stress caused by contacting the positioning member 60 is thus unlikely to occur. Therefore, the first welded portion 23a is unlikely to peel off despite the fact that the first non-welded portion 23d has a great surface area such that the first welded portion 23a has a smaller surface area than the second welded portion 23b.

(5) Each of the non-welded portions 23d is arranged over the entire first edge 21a in the extending direction of the first edge 21a. This decreases the welding surface area and the energy necessary for welding, compared to a case in which an additional welded portion is disposed locally in the first non-welded portion 23d.

(6) The bag-shaped separator 21 of each electrode accommodating separator 20 includes the first welded portion 23a and the first non-welded portion 23d along the first edge 21a. The weld width W1 of the first welded portion 23a is smaller than the weld width W2, W3 of each of the other welded portions 23b, 23c. Such smaller weld width W1 decreases the energy necessary for welding the separator members 22 together by the corresponding amount, compared to, for example, a case in which the first to third weld widths W1 to W3 are equal.

(7) In each electrode accommodating separator 20, to limit the entering of foreign matter into the bag-shaped separator 21, the first to third welded portions 23a to 23c are disposed along the corresponding first to third edges 21a to 21c in the extending directions of the corresponding edges 21a to 21c. In this configuration, the weld width W1 of the first welded portion 23a smaller than the width of each of the other welded portions effectively decreases the energy necessary for welding.

(8) The bag-shaped separator 21 of each electrode accommodating separator 20 includes the first non-welded portion 23d over the entire first edge 21a in the extending direction of the first edge 21a. The first non-welded portion 23d improves cushioning performance of the tab-side end face 12a. Therefore, when the rechargeable battery 10 is assembled, the force pressing the lid terminal assembly 53 is absorbed through the flexing of the first non-welded portion 23d. This restricts the hitting of the electrode assembly 12 against the inner bottom surface of the case main body 11a. As a result, when the electrode assembly 12 is accommodated in the case main body 11a, damage to the bottom side of the electrode assembly 12 is decreased.

(9) In each electrode accommodating separator 20, the width W4 of the first non-welded portion 23d along the first edge 21a is greater than the width W5 of the non-welded portion along the second edge 21b. The configuration of the present embodiment lacks the non-welded portion along the second edge 21b. This increases rigidity in the second welded portion 23b, compared to a case having the non-welded portion along the second edge 21b of the bag-shaped separator 21. The second welded portion 23b is thus unlikely to be deformed when the bottom of the electrode assembly 12 contacts the inner bottom surface of the case main body 11a. As a result, the positive electrode active material layer 16 and the negative electrode active material layer 26 are maintained in a state of being opposed to each other with the bag-shaped separator 21 located between the positive electrode and negative electrode active material layers 16, 26.

(10) The second welded portion 23b also exists on the second edge 21b of each bag-shaped separator 21. The rigidity of the lower end of the bag-shaped separator 21 is thus increased. As a result, even when the second edge 21b contacts the first guides 62, the second welded portion 23b limits deformation in the vicinity of the second edge 21b.

The above-described embodiment may be modified as follows.

In the above-described embodiment, when stacking the electrode accommodating separators 20 with the negative electrodes 24 to manufacture the electrode assembly 12, the second edges 21b, 24b of the electrode accommodating separators 20 and the negative electrodes 24 are brought into contact with the positioning member 60. In addition to this, the step of stacking the electrode accommodating separators 20 with the negative electrodes 24 includes a step of conveying the manufactured electrode accommodating separators 20 to an accommodation rack and a step of conveying the electrode accommodating separators 20 to the position at which the step of stacking the electrode accommodating separators 20 with the negative electrodes 24 will be performed.

Specifically, the manufactured electrode accommodating separators 20 are accommodated in a conveyance rack before being conveyed. Afterwards, the electrode accommodating separators 20 are conveyed. Then, the electrode accommodating separators 20 are drawn to a suction conveyance device and conveyed to the position at which the step of stacking the electrode accommodating separators 20 with the negative electrodes 24 will be performed.

When the electrode accommodating separators 20 are accommodated in the accommodation rack, the second edges 21b of the electrode accommodating separators 20 contact the accommodation rack. Before drawing the electrode accommodating separators 20 to the suction conveyance device, the second edges 21b of the electrode accommodating separators 20 are brought into contact with a positioning member to position the electrode accommodating separators 20. Even when the second edges 21b contact the accommodation rack and/or the positioning member, each second welded portion 23b limits deformation in the vicinity of the second edge 21b.

In the section of each surplus section 22a along the second edge 21b, a second non-welded portion may be disposed at a position closer to the second edge 21b than the second welded portion 23b. In this case, it is preferable that the width W5 of the second non-welded portion be smaller than the width W4 of the first non-welded portion 23d existing on the first edge 21a.

Figure 7:
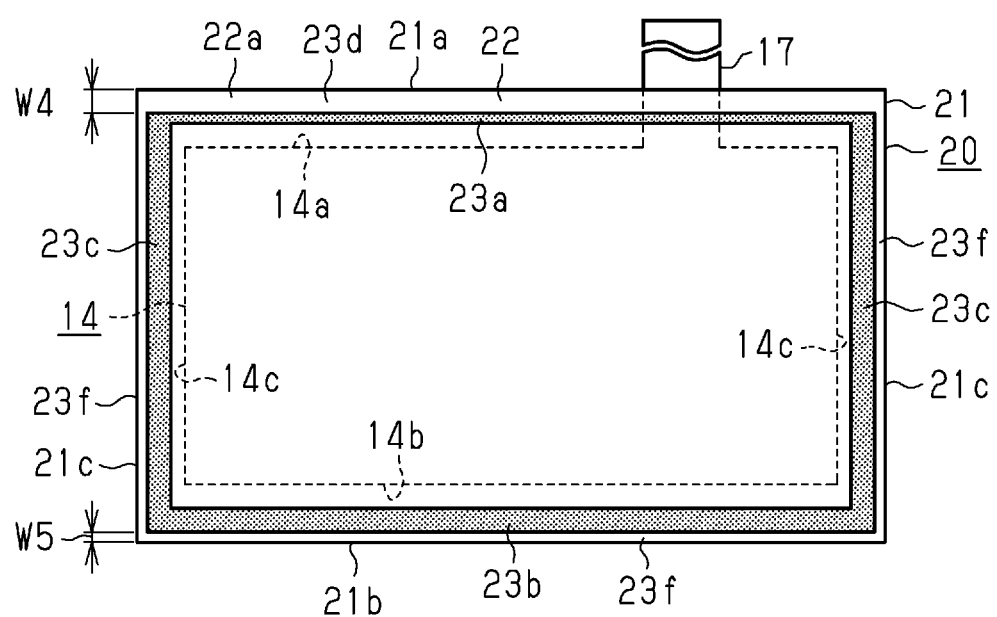
FIG. 7 is a plan view showing an electrode accommodating separator of a modification.

As illustrated in FIG. 7, non-welded portions 23f may be arranged in the sections in each surplus section 22a along the second and third edges 21b and 21c. In this case, it is preferable that the width W5 of the second non-welded portion 23f along the second edge 21b be smaller than the width W4 of the first non-welded portion 23d existing on the first edge 21a. Alternatively, non-welded portions may be disposed in the sections of each surplus section 22a along the first edge 21a and the third edges 21c, without arranging a non-welded portion in the section of the surplus section 22a along the second edge 21b. This configuration decreases the energy necessary for welding, compared to a case in which the surplus section 22a is configured entirely by a welded portion and lacks a non-welded portion.

The weld width W1 of the first welded portion 23a may be equal to the weld width W2 of the second welded portion 23b. Alternatively, the weld width W2 may be greater than the weld width W1. That is, as long as the section of each surplus section 22a along the first edge 21a of the bag-shaped separator 21 includes the first welded portion 23a and the non-welded portion 23d, the weld width W1 of the first welded portion 23a may be changed as needed.

Each separator member 22 and the associated positive electrode tab 17 may be welded together in the section of the surplus section 22a along the first edge 21a in which the positive electrode tab 17 exists.

Each electrode accommodating separator 20 may be configured by the bag-shaped separator 21 accommodating the negative electrode 24. In this case, the positive electrodes 14 correspond to the first electrodes and the negative electrodes 24 correspond to the second electrodes.

Each bag-shaped separator 21 may be configured including the first welded portion 23a and the second welded portion 23b exclusively, without having the third welded portions 23c.

Although each negative electrode 24 has the negative electrode active material layer 26 on the opposite surfaces of the negative electrode metal film 25, the negative electrode 24 may have the negative electrode active material layer 26 on only one of the opposite surfaces of the negative electrode metal film 25. Also, although each positive electrode 14 has the positive electrode active material layer 16 on the opposite surfaces of the positive electrode metal film 15, the positive electrode 14 may have the positive electrode active material layer 16 on only one of the opposite surfaces of the positive electrode metal film 15.

The power storage apparatus does not necessarily have to be the rechargeable battery 10 and may be any other power storage apparatus such as an electric double-layer capacitor.

Although the rechargeable battery 10 is a lithium-ion rechargeable battery, the rechargeable battery 10 may be any other rechargeable battery. That is, any suitable rechargeable battery may be the rechargeable battery 10 as long as the rechargeable battery allows for ion movement and transmission of electric charges between positive electrode active material and negative electrode active material.

Technical ideas obtainable from the above embodiment and the modifications are described below.

(1) A power storage apparatus in which the first non-welded portion exists over the entire first edge in the extending direction of the first edge.

(2) A power storage apparatus in which the welded portion also exists on an edge of the bag-shaped separator.

DESCRIPTION OF THE REFERENCE NUMERALS

S . . . Accommodating Portion; W1, W2, W3 . . . Weld Width; W4, W5 . . . Width; 10 . . . Rechargeable Battery as Power Storage Apparatus; 11 . . . Case; 11a . . . Case Main Body; 11b . . . Lid; 12 . . . Electrode Assembly; 14 . . . Positive Electrode as Second Electrode; 14a . . . First Edge; 17 . . . Positive Electrode Tab; 21 . . . Bag-shaped Separator; 21a to 21c . . . First to Third Edges; 22 . . . Separator Member; 22a . . . Surplus Section; 23a . . . First Welded portion; 23b . . . Second Welded Portion; 23c . . . Third Welded Portion; 23d . . . First Non-Welded Portion; 24 . . . Negative Electrode as First Electrode; 27 . . . Negative Electrode Tab; 24a . . . First Edge; 30 . . . Positive Electrode Terminal as Electrode Terminal; 32 . . . Positive Electrode Conductive Member; 40 . . . Negative Electrode Terminal as Electrode Terminal; 42 . . . Negative Electrode Conductive Member

The invention claimed is:

1. A power storage apparatus comprising an electrode assembly having a stacked structure in which first electrodes and second electrodes are stacked alternately, wherein
each of the first electrodes includes a tab shaped to project from an edge of the first electrode,
each of the second electrodes is accommodated in a bag-shaped separator and has a tab shaped to project from an edge of the second electrode,
each of the bag-shaped separators includes
a first separator member and a second separator member that are opposed to each other with the second electrode located in between, a surplus section that exists in a section of each of the separator members surrounding the second electrode, a first welded portion that exists along a first edge that is the edge of the bag-shaped separator from which the tab projects, the first welded portion being formed by welding the surplus sections of the separator members together, a first non-welded portion that is located closer to the first edge than the first welded portion and in which the separator members are not welded together, the first non-welded portion existing over the entire first edge in the extending direction of the first edge, a second welded portion that exists along a second edge that is an opposite side to the first edge of the bag-shaped separator, the second welding portion being formed by welding the surplus sections of the separator members together, and a second non-welded portion that is located closer to the second edge than the second welded portion and in which the separator members are not welded together, and the dimension of each of the first and second non-welded portions in a surface direction of the bag-shaped separator and a direction orthogonal to the edge is defined as a width, the following expression is satisfied:

the width of the first non-welded portion>the width of the second non-welded portion.

2. The power storage apparatus according to claim 1, wherein the second electrodes are positive electrodes.

3. The power storage apparatus according to claim 1, wherein the first welded portion exists over the entire first edge in the extending direction of the first edge, and the second welded portion exists over the entire second edge in the extending direction of the second edge.

4. The power storage apparatus according to claim 1, wherein the power storage apparatus is a rechargeable battery.

\* \* \* \* \*